Oct. 25, 1966   G. A. PETERSEN   3,280,927
FINGER-TYPE PILOT BIT

Filed Jan. 31, 1964   2 Sheets-Sheet 1

INVENTOR.
GERALD A. PETERSEN
BY
Julian Caplan
ATTORNEY

Oct. 25, 1966   G. A. PETERSEN   3,280,927
FINGER-TYPE PILOT BIT
Filed Jan. 31, 1964   2 Sheets-Sheet 2
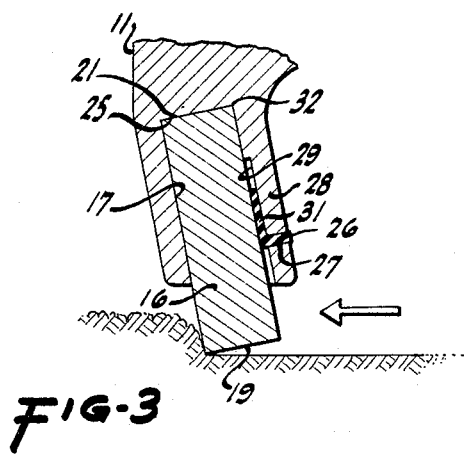
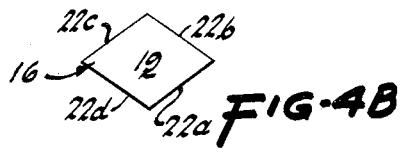
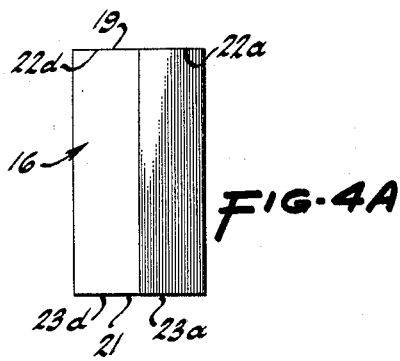
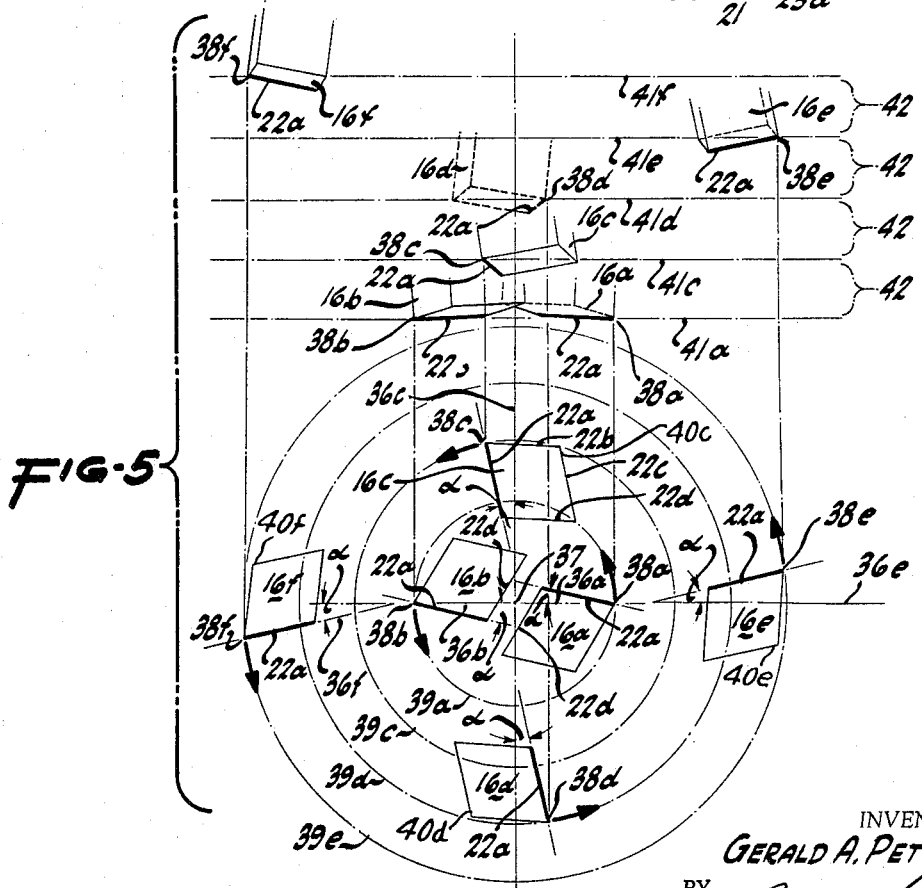
INVENTOR.
GERALD A. PETERSEN
BY
ATTORNEY 3,280,927
FINGER-TYPE PILOT BIT
Gerald A. Petersen, Sunnyvale, Calif., assignor of one-half to Anita E. Petersen, Saratoga, Calif.
Filed Jan. 31, 1964, Ser. No. 341,588
14 Claims. (Cl. 175—383)

This invention relates to a new and improved finger-type pilot bit. The function of a pilot bit, installed on the lower end of the central shaft on an auger, is to initially penetrate the soil so that the superimposed auger performs its drilling task more effectively than if no pilot bit, or if pilot bits of other design are used. Use of pilot bits is particularly desirable in hard or rocky ground since they penetrate the ground and break up the structure at the center of the hole and pull the main cutting portion of the auger downward into contact with the soil.

A particular feature of the present invention is the use of a plurality of removable cutting teeth which are held in sockets in the pilot bit head. The sockets are so positioned and relatively spaced that the teeth held therein are oriented for effective cutting.

A principal advantage of the present invention is the fact that cutting teeth are formed of tool steel bar stock, preferably of rhomboid cross-section. Thus pieces of tool steel may be cut from bar stock and used as cutting teeth, thereby considerably simplifying fabrication of the teeth as contrasted with other excavating tool teeth.

A further advantage of the invention is the fact that each tooth may be removed from its socket when the cutting edge of the tooth is dulled. As an important advantage of the present invention, the cutting tooth may be removed, turned 180° and replaced in its socket to present a second cutting edge when the first edge is dull. Thus by turning the tooth as each edge is dulled, two cutting edges may be used on each end of the tooth. Additionally, the tooth may be turned end-to-end, thereby presenting two additional cutting edges. Finally, the ends of the tool steel may be ground to renew the cutting edges. Inasmuch as the cutting edges of the teeth absorb substantially all of the wear of the cutting action, and since the cutting edges are readily renewable as heretofore described, the pilot bit may be kept sharp with a minimum of labor and effort indefinitely, and the life of the body of the bit in which the teeth are received is, for practical purposes, permanent.

Another feature of the invention is the provision of a convenient means to hold the tooth in its socket. Thus one wall of the socket is apertured and grooved and a piece of rubber or resilient material is inserted in the hole in the wall of the socket so that when the inner end of the tooth is jammed down into the socket, the rubber is compressed between the wall of the socket and the side of the tooth, thereby fractionally retarding withdrawal of the tooth from its socket. When it is necessary to remove the tooth, it may be pulled out against the fractional restraint of the rubber, or provision may be made to knock the tooth out of its socket from its inner end.

Still another feature of the invention is the fact that each socket is so positioned in the body of the pilot bit that the exposed end of the tooth is slanted rearwardly relative to the direction of rotation of the bit and thus the cutting edge of the tooth is lowermost. The arrangement of each tooth relative to the body provides "negative rake" so that there is no interference of rearward surfaces of the tooth with cutting action of the cutting edge. Location of the tooth at such angle provides automatically for rake even when the end of the tooth is at right angles to the tooth side so that the tooth need not be specially ground to provide such rake.

An additional feature of the invention is the manner in which the teeth are located relative to each other and relative to the body of the bit. Thus, the teeth are balanced diametrically on opposite sides of the central axis of rotation of the bit. Such balancing resists any tendency of the bit to deviate from a straight line of digging, and further reduces any tendency of the bit to wobble out of alignment.

A still further feature of the location of the teeth is the fact that certain of the teeth are staggered outwardly at different distances from the central axis of rotation so that their annular paths overlap. Thus, the annular path of one of the outermost teeth has its inner margin slightly closer to the central axis of rotation than the outermost edge of the next innermost tooth. This arrangement of staggered teeth insures that at least one tooth traverses every portion of the cross-sectional area of the hole being dug by the pilot bit.

A still further feature of the invention is the fact that the teeth are staggered in elevation. The two innermost or center teeth are at the same elevation but, assuming six teeth in the bit, each of the other four teeth are at increasingly higher elevation (in the normal cutting position of the bit) proceeding outwardly from the center. This staggered elevation of the teeth insures that the hole dug by the bit is cone-shaped with the apex of the cone downward. Such a conical shape of the hole is extremely effective in pilot bit action, since this shape is most effective to prevent deviation from a straight line and to prevent wobbling.

A still further feature of the invention is the fact that the two center teeth at the apex of the cone are parallel and diametrically opposed and equidistant from the axis. This cleans out the center of the hole and insures that there is no mound at the center of the hole on which the bit might hang.

All teeth other than the two center teeth are turned so that their cutting edges slant rearwardly at an acute angle of about 11°. This rearward, inward slanting of the cutting edge directs the soil cut inward toward the center, rather than outward of the hole, and thus insures that the soil or rock being cut is thoroughly comminuted.

Other features of the invention reside in the fact that a strong bit body is provided which adequately buttresses the cutting teeth. It will be understood that tool steel is relatively brittle and the body which surrounds the teeth is of a material which is relatively tough and absorbs the shock of digging, particularly when rocks and hard soil are encountered. At the same time, the teeth are hard and absorb the wear of the cutting action.

A further feature of the invention is the provision of means for ready attachment of the pilot bit to the auger or to the auger shaft.

Other objects of the present invention will become apparent upon reading the following specification and referring to the accompanying drawings in which similar characters of reference represent corresponding parts in each of the several views.

In the drawings:

FIG. 3 is a fragmentary sectional view taken substantially along the line 3—3 of FIG. 1 showing the means whereby the teeth are held in their sockets.

FIGS. 4A and 4B are respectively side-elevational and top plan views of one of the cutting teeth.

FIG. 5 is a schematic view showing the geometry of the positioning of the teeth and particularly their cutting edges with respect to their radial distance from the central axis of rotation and with respect to their elevation.

Figure 1:
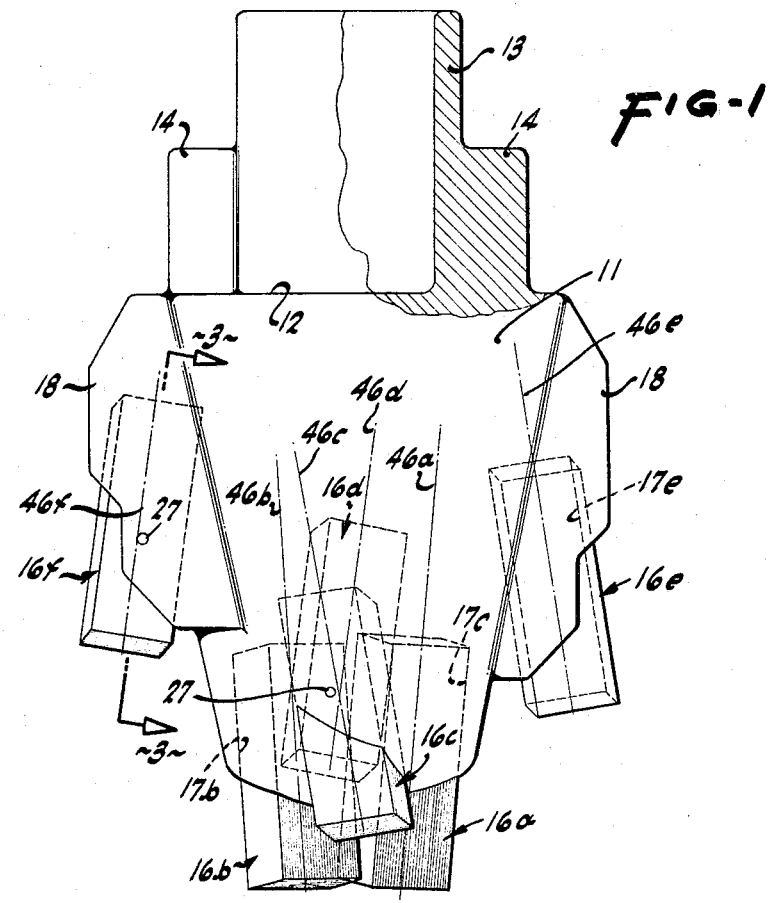
FIG. 1 is a side elevational view of the bit, partially broken away in section.
Figure 2:
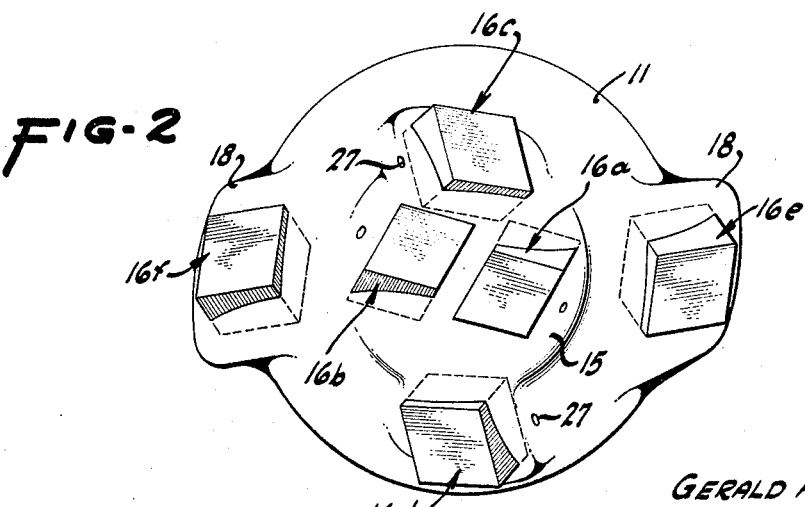
FIG. 2 is a bottom plan thereof.

The central body portion 11 of the pilot bit of the present invention is a downwardly-tapered cone having a spherical lower end 15. The upper end of the central portion of the body has a horizontal shoulder 12 having a stem 13 on its upper end for attachment to a shaft or connector. Stem 13 is preferably hollow and non-circular, but the shape thereof is subject to considerable variation. To reinforce stem 13 relative to body 11 a pair of diametrically opposed wings 14 serving as gussets may be positioned. The body 11 is preferably formed of cast steel or cast iron.

In the form of the invention herein illustrated, there are six teeth 16a to 16f in the bit, it being understood that the number and position of the teeth may be varied within the general scope of the invention. Each tooth 16 is received in a socket 17a to 17f formed in the central body portion 11. To reinforce socket 17e to 17f, bosses 18 may be formed integrally with body 11.

The teeth 16 are preferably initially formed of about a two-inch section of hard and abrasive-resistant bar stock tool steel. Each tooth 16, as shown particularly in FIGS. 4A and 4B, is prismatic, having square top and bottom ends 19, 21. In cross-section the tooth is rhomboid. its acute angle being 60°. Thus tooth 16 presents two cutting edges 22a, 22c at the top and two cutting edges 23a, 23c at the bottom. It is a feature of the invention, as heretofore explained, that each of the cutting edges 22a to 22c may be used serially and then the tooth may be reversed and the other two cutting edges 23a to 23c used. Thus the replaceable teeth 16 are relatively inexpensive and no grinding operation is required initially to put them into condition for use. It will be understood, of course, that after the tooth has been used the cutting edges become worn. The tooth may be reconditioned by regrinding the ends 19, 21 square. The teeth 16, in their initial condition, project out of their sockets 17 from the body 11 a short distance, since bottom end 21 seats against the bottom 25 of socket 17, there being sufficient exposure of the tool steel so that a certain amount of wear may occur before the abrasion of the digging action dulls the cutting edge.

Various means may be employed to hold each tooth 16 in its socket 17. A preferred form herein illustrated is the use of a key 26 comprising a short, round section of rubber or rubber-like material. A hole 27 is formed in one wall 28 of socket 17 and, preferably, a longitudinal groove 29 along the wall communicating with hole 27. The inner end 31 of rubber key 26 sticks into socket 17 and, when tooth 16 is forced into the socket, key end 31 is compressed between groove 29 and the adjacent side of tooth 16. Thus key 26 frictionally resists unintentional dislodgment of the tooth from its socket. When it is necessary to remove tooth 16, the tooth may be gripped with a pincer-like instrument and pulled against the frictional resistance of key 26 or, alternatively, a hole 32 may be formed in body 11 communicating with the inner end of each socket 17 so that an instrument (not shown) may be inserted in hole 32 in to contact with bottom end 21 of tooth 16 and upon driving the instrument with a hammer the tooth may be forced out of its socket.

The location of the various teeth 16a–f in head 11 is determined by the location and angular position of the respective sockets 17a–f therefor. In defining the positions of the teeth, it will be assumed that side 22a of the rhombus is the cutting edge, that particular edge 22a being the lowermost edge and being that particular edge which is closest to a radius 36a to 36f (FIG. 5) drawn through the central axis of rotation 37 of the tooth, it being understood, as hereinafter explained in detail, that none of the cutting edges 22a is precisely radial. Description of the location of the six teeth herein illustrated is best accomplished by considering the outer end or corner 38a to 38f of the cutting edge as reference point. Such corner 38a to 38f will be hereinafter termed the "locating corner." It will be noted that with respect to the two center teeth 16a, 16b which are inserted in the spherical end 15 of body 11, the locating corners 38a, 38b are diametrically opposed (i.e., on the same diameter 36a, 36b) and equidistant from central axis 37 (i.e., on the same circle 39a), and are at the same elevation 41a. The third tooth 16c has its locating corner 38c displaced about 110° from diameter 36a, 36b and is spaced outwardly from axis 37 on circle 39c which has a radius larger than that of circle 39a a distance slightly less than the length of cutting edge 22a. Tooth 16c is so located that its outside rear corner 40c is at a lesser radial distance from axis 37 than corner 38c and hence does not interfere with rotation of the bit. In this manner, the annular path of third tooth 16c overlaps the path of the two center teeth 16a, 16b. The elevation 41c of corner 38c is higher than elevation 41a of corners 38a, 38b by an increment 42 of about ⅝″.

Locating corner 38d of fourth tooth 16d is spaced diametrically opposite corner 38c on diameter 36c, 36d. The third tooth is spaced outwardly from axis 37 on circle 39d of a radius greater than that of 39c by slightly less than the width of cutting edge 22a. The elevation 41d of locating corner 38d is the same increment 42 above elevation 41c.

The fifth and sixth teeth 16e, 16f are diametrically opposed to each other on diameter 36e to 36f which are displaced about 90° from 36c to 36d. The radial distance of the locating corners 38e, 38f of the fifth and sixth teeth from axis 37 is the same (both points lying on circle 39e) and is greater than the radius of circle 39d by a distance slightly less than the length of cutting edge 22a. Rear outside corners 40e, 40f are similarly at lesser radial distances than corners 38e, 38f to prevent "heeling." Point 38e at elevation 41e is elevated above point 38d by the increment 42. Point 38f at elevation 41f is elevated above point 38e by the same increment 42.

The longitudinal axes 46a, 46b of the sockets 17a, 17b of the two middle teeth 16a, 16b teeth slant downwardinwardly toward the axis of rotation 37.

The axes 46a, 46b of the sockets 17a, 17b slant rearwardly relative to the direction of rotation so that cutting edges 22a of teeth 16a, 16b are lowermost and ends 19 slant upwardly-rearwardly, thereby automatically providing rake for the teeth. This same relationship prevails for teeth 16c, 16f as well. The inner side edges 22b (as distinguished from the cutting edges 22a) of center teeth 16a, 16b are parallel to each other and equidistant from axis 37. The cutting edges 22a of teeth 16a, 16b slant inwardly-forwardly relative to the direction of rotation (counterclockwise in FIG. 5). Radii 36a, 36b make an acute angle α with cutting edges 22a of teeth 16a, 16b of about 11°.

The axes 46c to 46f of the third to sixth teeth 16c to 16f slant outwardly relative to axis 37 (see FIG. 1; cf axes 46a, 46b).

Radii 36c to 36f make an acute angle α with the leading edges 22a of teeth 16c to 16f, respectively of about 11°, but it is noted that the cutting edges 22a slant inwardly-rearwardly relative to the direction of rotation. Contrast with the inwardly forward slant of corresponding cutting edges of teeth 16a, 16b.

It will be observed that the foregoing arrangement of teeth provides balance in that pairs of teeth, 16a–16b, 16c–16d, 16e–16f, for practical purposes, are diametrically opposed to each other. Furthermore, the staggered elevation of the teeth provides a cone-shape cut.

When one or more of the teeth is worn, the worn tooth 16 is removed from its socket 17, turned 180°, and reinserted, whereupon a new cutting edge 22c is presented. When both cutting edges 22a, 22c are worn, the tooth is reversed and the additional two edges 23a, 23c are used serially. When all four edges are worn, the tooth may be ground to initial shape and reused so long as the cutting edge projects out of the socket.

Although the foregoing invention has been described in some detail, by way of illustration and example for purposes of clarity of understanding, it is understood that certain changes and modifications may be practiced within the spirit of the invention and scope of the appended claims.

What is claimed is:

1. A rotary bit comprising a body formed with a plurality of sockets, a tooth in each said socket complementary to said socket, and means for removably holding each said tooth in its respective socket, each said tooth comprising a short section of prismatic hard material bar stock of rhomboid shape in cross-section partially projecting from said body, at least the exposed end of said tooth being perpendicular to the sides of said tooth, said sockets formed so that one side edge of the exposed end of each said tooth is the cutting edge in the direction of rotation of said bit, said cutting edge being lowermost in elevation when said bit is in position for vertical drilling and said cutting edge viewed in bottom plan being disposed at an acute angle to a radius from the axis of rotation to the outermost corner of said cutting edge, said cutting edge slanting rearwardly-inwardly.

2. A bit according to claim 1, in which said acute angle is approximately 11°.

3. A bit according to claim 1, in which said body is formed with a plurality of holes extending from the exterior into each said socket, said means comprises for each said socket a short section of resilient material partially in said hole and extending into said socket, said section compressed between said tooth and a wall of said socket.

4. A bit according to claim 1, in which the annular paths cut by said cutting edges as said bit rotates overlap viewed in plan to cover an entire circle having a diameter greater than the maximum width of said body.

5. A bit according to claim 1, in which said sockets are formed so that one side edge of the exposed end of each said tooth is the cutting edge in the direction of rotation of said bit, said cutting edge being lowermost in elevation when said bit is in position for vertical drilling and generally approximately radially disposed in plan, and viewed in bottom plan the first and second teeth are nearest the axis of rotation and symmetric thereto and at lowest elevation.

6. A bit according to claim 5, in which said third tooth is higher than said first two teeth and said fourth tooth higher than said third tooth.

7. A bit according to claim 6, in which the cutting edge of said third tooth is disposed at an acute angle to a radius from the axis of rotation to the outermost corner of said cutting edge, said cutting edge slanting rearwardly-inwardly.

8. A bit according to claim 5, in which the fifth and sixth teeth are diametrically opposed and displaced about 90° from said third and fourth teeth and at a greater distance from said axis than said fourth tooth.

9. A bit according to claim 8, in which the cutting edge of said third tooth is displaced outward from the annular path cut by said first two teeth by an increment slightly less than the length of said cutting edge, said fourth tooth spaced outward of said third tooth by approximately the same increment and the fifth tooth outward of said fourth tooth by approximately the same increment.

10. A bit according to claim 9, in which said third, fourth, fifth and sixth teeth are at progressively higher elevations.

11. A bit according to claim 10, in which each of said third to sixth teeth differ in elevation from the next highest tooth by approximately the same increment in elevation.

12. A bit according to claim 5, in which the axes of the sockets of the first two teeth slant inwardly-downwardly relative to said axis of rotation.

13. A bit according to claim 1, in which said sockets are formed so that one side edge of the exposed end of each said tooth is the cutting edge in the direction of rotation of said bit, said cutting edge being lowermost in elevation when said bit is in position for vertical drilling and generally approximately radially disposed in plan and viewed in bottom plan the last two teeth farthest from the axis of rotation are at the same distance from said axis and diametrically opposed and are higher than the other teeth.

14. A bit according to claim 13, in which one of said last two teeth is higher than the other.

References Cited by the Examiner

UNITED STATES PATENTS

| | | | |
|---|---|---|---|
| 1,351,978 | 9/1919 | McQueston | 29—105 |
| 1,388,490 | 8/1921 | Suman | 175—413 X |
| 1,443,344 | 1/1923 | Chapman | 175—392 |
| 1,593,586 | 7/1926 | Meredith | 175—392 X |
| 2,111,785 | 3/1938 | Kittrel | 175—392 |
| 2,800,302 | 7/1957 | McClennan | 175—391 |
| 3,026,600 | 3/1962 | Payne | 29—96 |
| 3,156,032 | 11/1964 | Lundgren | 29—96 |

CHARLES E. O'CONNELL, *Primary Examiner.*

N. C. BYERS, *Assistant Examiner.*